US008095308B2

(12) United States Patent
Tsuji (10) Patent No.: US 8,095,308 B2
(45) Date of Patent: Jan. 10, 2012

(54) NAVIGATION APPARATUS (75) Inventor: Kenji Tsuji, Gifu (JP)

(73) Assignee: DENSO CORPORATION, Kariya (JP)

( * ) Notice: Subject to any disclaimer, the term of this patent is extended or adjusted under 35 U.S.C. 154(b) by 677 days.

(21) Appl. No.: 12/230,218

(22) Filed: Aug. 26, 2008

(65) Prior Publication Data

US 2009/0063048 A1 Mar. 5, 2009

(30) Foreign Application Priority Data

Aug. 31, 2007 (JP) ................. 2007-225153

(51) Int. Cl.
G01C 21/30 (2006.01)
G01C 21/32 (2006.01)
G01C 21/00 (2006.01)
(52) U.S. Cl. ...................... 701/212; 701/209
(58) Field of Classification Search ........... 701/200–212
See application file for complete search history.

(56) References Cited

U.S. PATENT DOCUMENTS

| 5,189,430 | A | | 2/1993 | Yano et al. | |
|---|---|---|---|---|---|
| 5,732,385 | A | * | 3/1998 | Nakayama et al. | 701/201 |
| 6,067,502 | A | * | 5/2000 | Hayashida et al. | 701/209 |
| 7,873,470 | B2 | * | 1/2011 | Baba et al. | 701/209 |
| 2006/0074553 | A1 | * | 4/2006 | Foo et al. | 701/212 |
| 2007/0083324 | A1 | * | 4/2007 | Suzuki et al. | 701/201 |
| 2008/0162032 | A1 | * | 7/2008 | Wuersch et al. | 701/201 |
| 2008/0275637 | A1 | * | 11/2008 | Kim et al. | 701/201 |

FOREIGN PATENT DOCUMENTS

| JP | A-58-80514 | 5/1983 |
|---|---|---|
| JP | A-9-184732 | 7/1997 |
| JP | A-9-222330 | 8/1997 |
| JP | A-2002-168636 | 6/2002 |
| JP | A-2004-286496 | 10/2004 |
| JP | A-2005-227374 | 8/2005 |
| JP | A-2006-258820 | 9/2006 |

OTHER PUBLICATIONS

Google, "Review Guide—Google Maps for Mobile (Beta)" Apr. 2006.*
Image—"Google Maps for Mobile" pcmag.com Mar. 2007.*
Lendino, Jamie, "Google Maps for Mobile" review, pcmag.com Mar. 2007.*
Sturgell, Ryan et al., "It's a click and drag situation" Google Lat Long Blog Jun. 28, 2007.*
Mio DigiWalker User Manual MioMap v3.2, Aug. 2006.*
Popa, Bodgan, "Calcuate the Distance using Google Maps" Softpedia Jan. 9, 2007.*
Howard, Beverly, "Converting Google Maps' directions into turn by turn GPS route/ waypoint files" Jun. 28, 2007.*
"Volvo XC90 Road and Traffic Information", 2003, Volvo Car Corporation, EU, p. 11.
Office Action issued from the Japanese Patent Office on Aug. 4, 2009 in the corresponding Japanese patent application No. 2007-225153 (and English translation).

* cited by examiner

Primary Examiner — Neal Sereboff
(74) Attorney, Agent, or Firm — Posz Law Group, PLC

(57) ABSTRACT

In a navigation apparatus, a control device superimposes, on a displayed map in a display device, a plurality of marks for indicating a guidance route around a guidance point. The control device fixes a real distance of an interval between the marks without depending on the change in the scales of the map.

20 Claims, 5 Drawing Sheets

| COVERING AREA | SCALE | SCALE RATIO | REAL DISTANCE OF MARK INTERVAL | NOTE |
|---|---|---|---|---|
| NARROW | 50m | C/50 | 100m | DISPLAYABLE |
| ↑ | 100m | C/100 | 100m | DISPLAYABLE |
|  | 200m | C/200 | 100m | DISPLAYABLE |
| ↓ | 400m | C/400 | 100m | DISPLAYABLE (BOUNDARY) |
| WIDER | 800m | C/800 | – | – |

— # NAVIGATION APPARATUS

CROSS REFERENCE TO RELATED APPLICATION

This application is based on and incorporates herein by reference Japanese Patent Application No. 2007-225153 filed on Aug. 31, 2007.

FIELD OF THE INVENTION

The present invention relates to a navigation apparatus.

BACKGROUND OF THE INVENTION

A navigation apparatus is known as navigating a user to a destination or displaying a map as needed. Generally, the above navigation apparatus reads map information from a recording medium such as a CD-ROM based on a speed, heading direction, present position or the like of a user or a vehicle to thereby display a peripheral map including the present position in a liquid crystal display monitor etc. The navigation apparatus further calculates a guidance route from a predetermined departure point to a predetermined destination point and displays the present position and the guidance route.

Further, a navigation apparatus disclosed in Nonpatent Document 1 has a function to display marks such as triangles in regular intervals on the guidance route near a predetermined guidance point or navigating point such as a destination point or an intersection where a left/right turn is needed. In such a function, the display of the map is enlarged greater as the present position is closer to the guidance point.

Further, the displayed distance of an interval (namely, the displayed visible interval between the marks) for indicating a guidance route is generally fixed regardless of the change in scales of maps. Therefore, even if the scale of the map is changed, the displayed distance of the interval between the marks is not changed. Thus, in the navigation apparatus in Nonpatent Document 1, when the map scale is changed, a user has a difficulty in intuitively recognizing a real distance of the interval on the map.

Nonpatent Document 1: "Volvo XC90 ROAD AND TRAFFIC INFORMATION" Volvo Car Corporation, EU, p 11

SUMMARY OF THE INVENTION

It is an object to provide a navigation apparatus allowing a user to recognize a distance on a map more easily even if a scale of the map is changed.

According to an example of the present invention, a navigation apparatus is provided as follows. A map data is inputted. A departure point and a destination point are designated. A route is retrieved from the departure point to the destination point using the map data. A plurality of marks are displayed in a mark display range on a map generated based on the map data. The mark display range includes at least one of a forward direction and a backward direction along the retrieved route with a guidance point assigned as a base point. Map scales are switched therebetween. Herein, a real distance of an interval between the marks displayed on the map is fixed, without depending on the map scales switched.

According to another example of the present invention, a method is provided for displaying a map in a navigation apparatus storing map data and retrieving a route to a destination. The method includes: (i) displaying a plurality of marks in a mark display range on a map generated based on the map data, the mark display range including at least one of a forward direction and a backward direction along the retrieved route with a guidance point assigned as a base point; (ii) switching map scales therebetween; and (iii) displaying the plurality of marks after the map scales are switched by fixing a real distance of an interval between the marks displayed on the map, without depending on the map scales switched.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An embodiment of the present invention is directed to a navigation apparatus provided in a vehicle, for instance. The embodiment is explained with reference to drawings.

Figure 1:
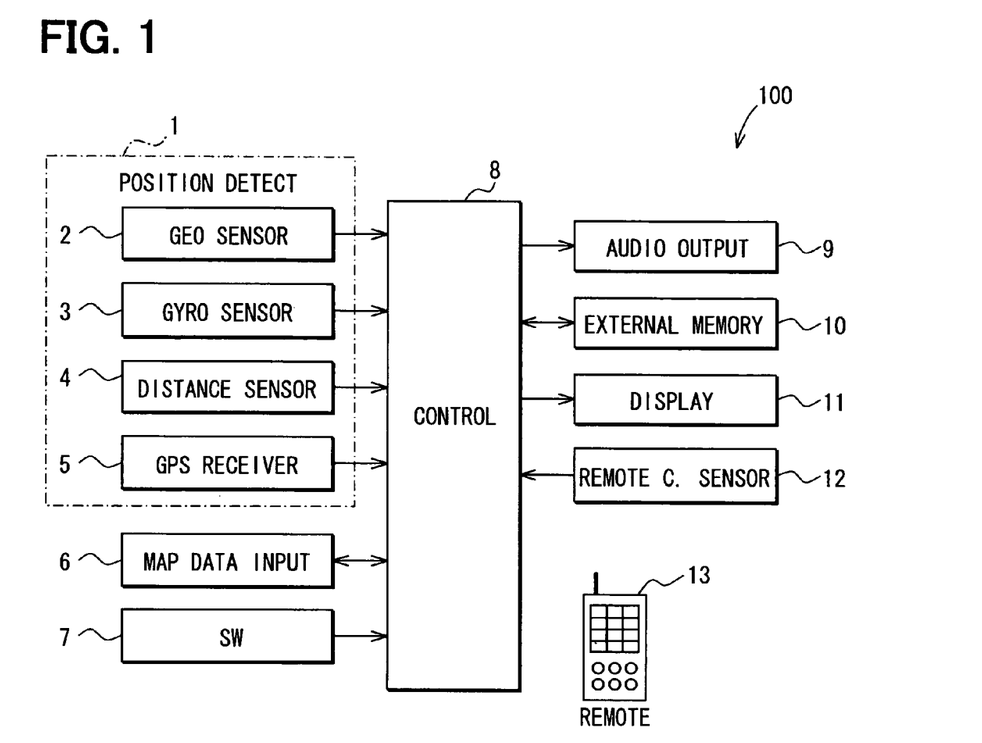
FIG. 1 is a block diagram showing a configuration of a navigation apparatus according to an embodiment of the present invention.

As shown in FIG. 1, a navigation apparatus 1 mounted in a subject vehicle includes the following: a position detection device 1, a map data input device 6, an operation switch group 7, an audio output device 9, an external memory 10, a display device 11, a remote control sensor 12, a remote control (i.e., a remote) 13, and a control device 8 connected with the foregoing.

The position detection device 1 includes following known sensors or the like: a geomagnetic sensor 2, a gyroscope 3, a distance sensor 4, and a GPS receiver 5 for GPS (Global Positioning System) which detects a present position of the vehicle based on electric waves from satellites. The individual sensors or the like have types of detection errors different from each other; therefore, they are used to complement each other. In addition, part of the sensors or the like may be used depending on the required detection accuracy or each sensor's detection accuracy. Further, another sensor or the like such as a revolution sensor of steering and a wheel sensor of a following wheel may be used.

The map data input device 6 is used for inputting the various data containing map data, data for map matching for improving positioning accuracy, and landmark data from a storage medium (not shown) inserted into the map data input device 6 itself. Thus, the map data input device 6 functions as an example of a map data input means. The map data include road data having node data and link data for indicating roads. Nodes are points at which roads cross, branch, or join; links are segments between nodes. A road is constituted by connecting links. Link data relative to each link include a unique number (link ID) for specifying the link, a link length for indicating the length of the link, start and end node coordinates (latitudes and longitudes), a road name, a road class, a road width, the number of lanes, presence/absence of dedicated lanes for right/left turn and the number thereof, and a speed limit.

Node data relative to each node include a unique number (node ID) for specifying the node, node coordinates, a node name, connection link IDs for indicating links connected to the node, and an intersection class.

Moreover, the above storage medium include data on classes, names, and addresses of various facilities, which are used to designate destinations in route retrieval, etc. The above storage medium has a function as a map data storage means, and may be a CD-ROM, DVD-ROM, memory card, HDD, or the like.

The operation switch group 7 is, for instance, a mechanical switch or touch switch integrated with the display device 11 and demands executions of various functions to the control device 8 based on switch operations. The executed functions include, for example, a map scale change, a menu display selection, a destination designation, a route retrieval, a route guide start, a present position correction, a display window change, and a volume control. In addition, the operation switch group 7 includes a switch for setting a departure point and a destination point. By operating the switch, the user can designate the departure point and destination point from points previously registered, facility names, telephone numbers, addresses, etc. The operation switch group 7 function as an example of a designation means or device.

The remote control 13 has multiple operation switches (not shown) for inputting various command signals into the control device 8 via the remote control sensor 12 by switch operation to execute the same function as the operation switch group 7 to the control device 8. Therefore, the remote control 13 also functions as a designation means or device.

The audio output device 9 includes a speaker and outputs guidance sounds in the route guidance based on instructions by the control device 8.

The external memory 10 is a rewritable memory with a large data volume such as a hard disk drive (HDD). The external memory 10 stores data, which need to be inerasable even if power supply is turned off, or is used for copying frequently used data from the map data input device 6. In addition, the external memory 10 may be removable memory with comparatively small data capacity.

The display device 11 displays maps or destination selection windows for guiding the vehicle in travel, and is able to display images in full colors using such as a liquid crystal display, an organic electroluminescence display, or a plasma display.

The control device 8 is a usual computer to contain have a CPU, ROM, RAM, I/O, and bus line connecting the foregoing components (none shown). The control device 8 functions as an example of a route retrieval means or control unit, a map scale switching means or control unit, or a presentation means or control unit, which will be explained later. The control device 8 executes processes as a navigation function based on a variety of information inputted from the position detection device 1, the map data input device 6, the operation switch group 7, the external memory 10, and the remote control sensor 12. Such processes as the navigation function include, for example, a map scale change process, a menu display selection process, a destination designation process, a route retrieval execution process, a route guidance start process, a present position correction process, a display window change process, and a volume control process.

For example, when the departure point and the destination point are set by the operation switch group 7 or remote control 13 via the remote control sensor 12, an optimal route from the departure point to the destination point is automatically retrieved using the map data, and the control device 8 designates and displays a guidance route. Therefore, the control device 8 functions as an example of a route retrieval means or control means and a presentation means or control unit. The technique of designating a guidance route automatically uses, for instance, the known Dijkstra method. In addition, when a passing point is designated via the operation switch group 7 or remote control 13, an optimal guidance route is retrieved to pass through the designated passing point by the control device 8.

In addition, the control device 8 displays on the display device 11 a present position mark corresponding to a present position inputted from the position detection device 1, and a road map around the present position generated based on the map data inputted from the map data input device 6. The control device 8 performs an enlargement display of a map automatically, when the present position or the vehicle approaches a guidance point or an action point for navigating. The control device 8 further performs a map scale change (or map scale switching) for changing scales of the map according to the operation instruction via the operation switch group 7. Therefore, the control device 8 functions also as an example of a map scale switching means or control unit.

Furthermore, the control device 8 designates as a mark display range a Predetermined range forward and backward of a reference guidance point along a travel direction in the retrieved guidance route. Multiple marks each having an identical shape are displayed within the mark display range on the map displayed in the display device 11 based on the map data while being arranged at a fixed interval therebetween. The shape of the multiple marks can have any shape such as a triangle, a quadrangle, and a circle. In addition, the individual marks need not have an identical shape. The reference guidance point and the mark display range will be explained later again.

In addition, when the map scale change process is executed in the state where the guidance route is displayed, the control device 8 determines whether a scale designated after the map scale change process corresponds to a mark displayable scale, which allows an execution of a map display process. Furthermore, a mark display range determination process is executed for determining a mark display range based on a result of the above determination. When the mark display range is determined in the mark display range determination process, a mark display process is executed for displaying multiple marks in the display device 11. Below, the mark display range determination process and the mark display process are explained using FIGS. 2 to 10.

Figure 2:
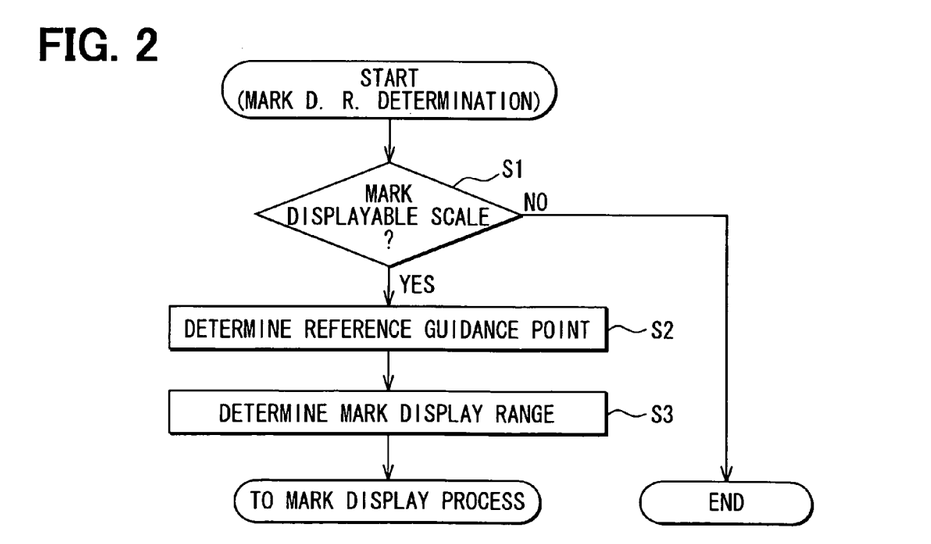
FIG. 2 is a flowchart illustrating an example of a mark display range determination process.
Figure 3:
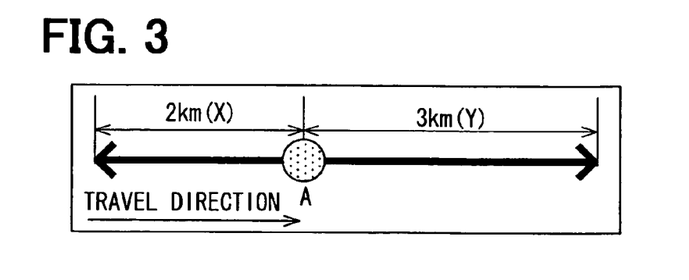
FIG. 3 is a schematic diagram illustrating an example of a mark display range.
Figure 4:
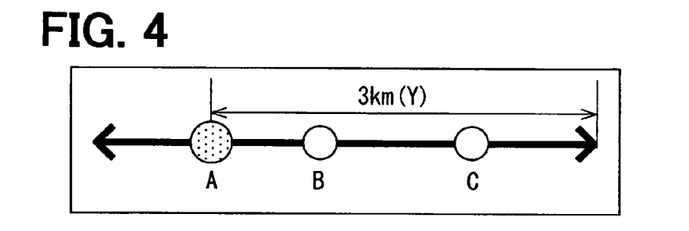
FIG. 4 is a schematic diagram illustrating an example of a guidance point.

First, the mark display range determination process is explained using a flowchart of FIG. 2. At S1, it is determined whether a map scale after the map scale change is allowed to display marks, i.e., whether a map scale after the map scale change corresponds to a mark displayable scale. When it corresponds to a mark displayable scale (S1: Yes), the processing moves to S2. In contrast, when it does not correspond to a mark displayable scale (S1: No), the process is ended by determining that the mark display process is not executed. Herein, a mark displayable scale signifies a scale which allows an execution of a mark display process as mentioned above. When a first scale has a first scale ratio greater than a scale ratio of a predetermined mark display boundary scale, the first scale corresponds to a mark displayable scale. For instance, a scale of 400 m having a scale ratio of C/400 (C is a constant unit length in a display screen) is assigned as a mark display boundary scale. The scale of 100 m having a scale ratio of C/100 is determined to be a mark displayable scale. In contrast, a scale of 800 m having a scale ratio of C/800 is determined to be not a mark displayable scale. In other words, a map with a mark displayable scale covers a narrower area than a map with a mark display boundary scale.

At S2, a reference guidance point is assigned to the nearest guidance point on the guidance route from the user's present position. In other words, a reference guidance point corresponds to a guidance point which the user reaches earliest among guidance points ahead of the user's present position. Further, the reference guidance point is a predetermined point designated based on the present position of the user along the guidance route. Herein, a guidance point corresponds to an action point for navigation and can be explained further as follows. For instance, at a guidance point, an enlarged map is displayed by replacing the map displayed until then. The display mode of the map displayed in the display device 11 is thus changed from until then; thereby, an occupant or user is provided with navigational guidance regarding the guidance point. The guidance point includes a passing point designated via the operation switch group 7 or the remote control 13, an intersection on the guidance route which needs to carry out a right/left turn, and a destination point, for example.

Furthermore, at S3, a mark display range is determined as ranging between (i) X km short of the reference guidance point (i.e., X km backward of the reference guidance point along the travel direction) and (ii) Y km ahead of the reference guidance point (i.e., Y km forward of the reference guidance point along the travel direction). Herein, the reference guidance point can be used as a base point. In addition, for example, X and Y are numerical values which can be designated as needed and are real distances independent of the change in the map scales. In an example shown in FIG. 3, a mark display range is determined as X=2 (km) and Y=3 (km); thus, it ranges between 2 km short of and 3 km ahead of the reference guidance point A along the travel direction.

In addition, even if a mark display range contains another guidance point other than the reference guidance point, another guidance point other than the reference guidance point is not used as a base point; instead, the reference guidance point is only used as a base point for determining a mark display range. In an example shown in FIG. 4, a mark display range is determined as Y=3 (km) with the reference guidance point A used or assigned as a base point even though other guidance points B, C are located within the determined mark display range. In other words, the guidance point B and the guidance point C are not regarded as a base point for determining a mark display range.

After executing above S3, a mark display process is performed. Next, the mark display process is explained. It is first assumed that a distance between the vehicle and the reference guidance point is within a mark display execution distance. Marks are displayed at a fixed interval therebetween with one end of the mark display range assigned as a base point within the mark display range determined in the foregoing mark display range determination process.

The interval of the marks is designed such that a real distance of the interval is fixed without depending on the individual scales of the map. The fixation of a real distance of the interval of the marks is explained using an example shown in FIG. 5. The real distance of the interval of the marks are not based on the scales of the map, such as 50 m, 100 m, 200 m, and 400 m, but the real distance is fixedly set as 100 m alone with respect to all the scales. In addition, in the example of FIG. 5, the mark display boundary scale is set to 400 m. Any scale such as a scale of 800 m having a smaller scale ratio than a scale ratio of a scale of 400 m is not regarded as a mark displayable scale. Thus, a map with a scale of 800 m does not contain a mark. The real distance of the interval of the marks is not set for a scale of 800 m.

Figure 5:
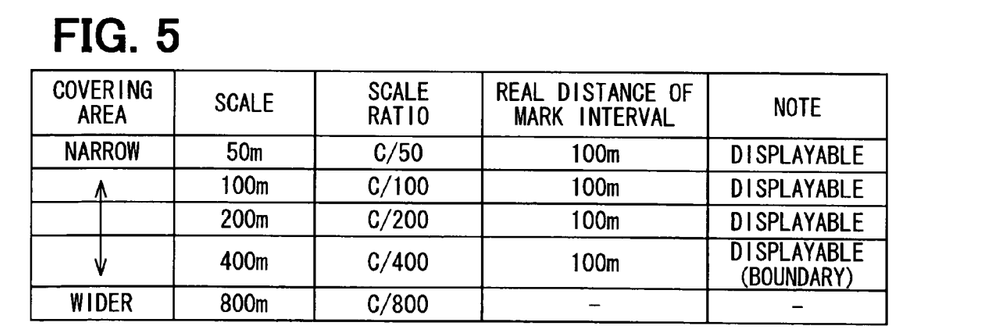
FIG. 5 is a diagram illustrating an example of a relation between map scales and real distances of intervals of marks.

In addition, although the real distance of the interval of the marks is 100 m in the example of FIG. 5, the real distance can be changed to another value or distance as needed. In addition, although all the real distances of the interval of the marks are set as 100 m in the example of FIG. 5, the real distances need not accord with each other as long as they are substantially equivalent to each other. For instance, the real distances of 99 m, 100 m, 101 m are regarded as substantially same values.

Figure 6:
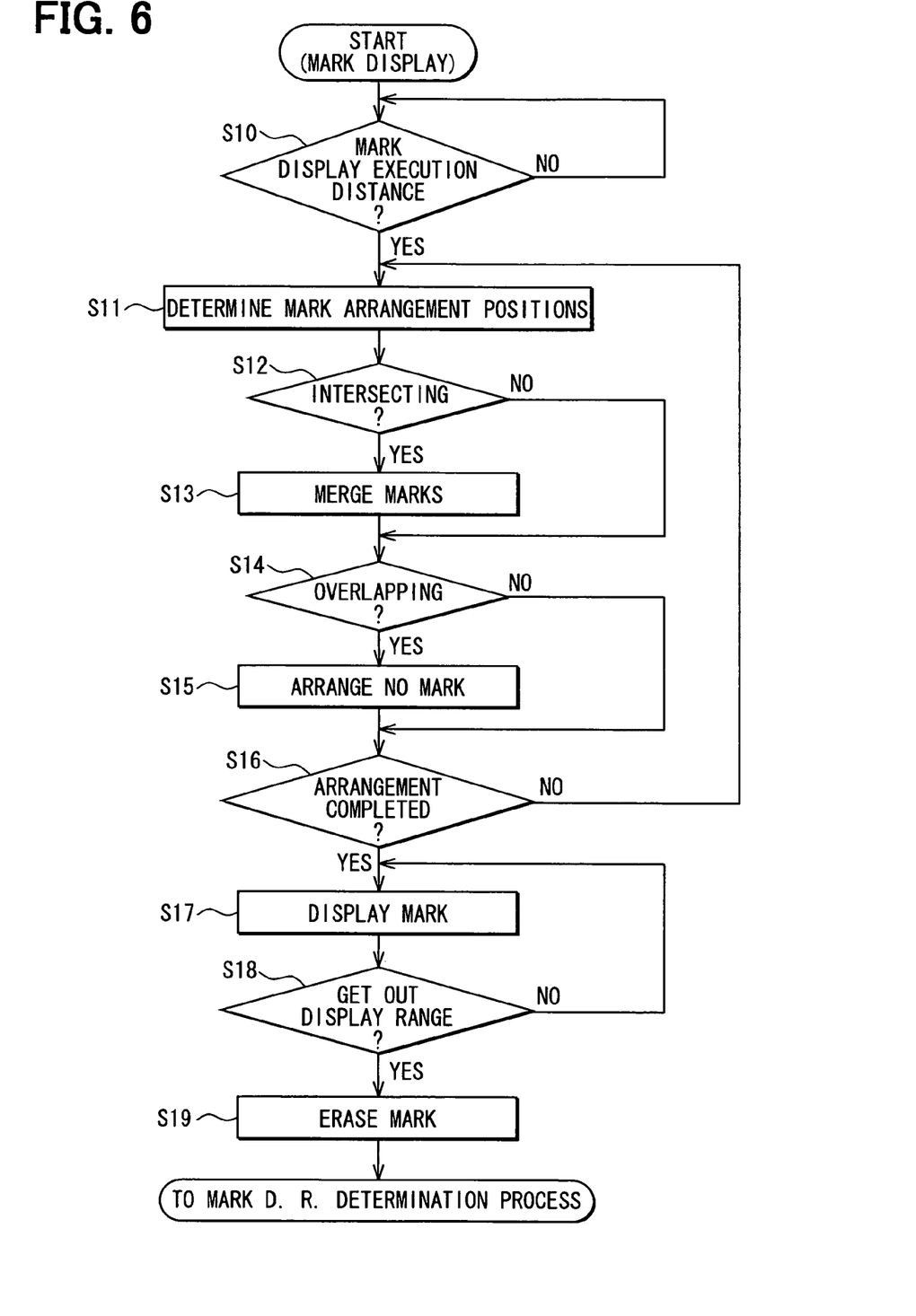
FIG. 6 is a flowchart illustrating an example of a mark display process.
Figure 7:
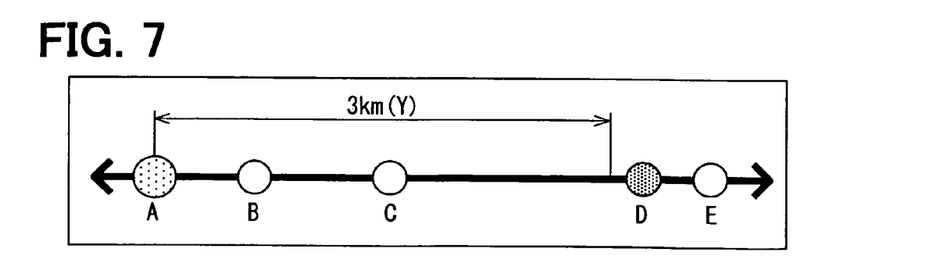
FIG. 7 is a schematic diagram illustrating an example of a next reference guidance point.

Next, the mark display process is explained using a flow-chart of FIG. 6. At S10, it is determined whether the distance between the vehicle and the reference guidance point is within a mark display execution distance. The mark display execution distance is set as, of the mark display range, a designated distance (e.g., X in FIG. 3) short of the reference guidance point, or a distance (i.e., X+alfa) being a little longer than the designated distance. When the determination at S10 is No, S10 is executed again. In contrast, when the determination at S10 is Yes, S11 and its subsequent processing are executed to thereby display marks in the display device 11.

At S11, arrangement positions of the marks are determined. S11 is repeatedly executed until all the arrangement positions of the marks are completely determined. At the initial execution at S11, one end (short of the base point in the present embodiment) of the mark display range is determined as an arrangement position of a mark. Furthermore, at the subsequent executions at S11, each of the arrangement positions is determined as being closer to the other end of the mark display range by a fixed distance with respect to the initially determined arrangement position or previously determined arrangement position.

Then, at S12, it is determined whether the mark arrangement position determined at S11 taking place just before is included in an intersecting portion of the guidance route, which will be explained later, and the intersecting portion is already assigned with a mark. When the determination at S12 is Yes, the processing moves to S13. At S13, (i) the mark whose arrangement position is determined at S11 taking place just before and (ii) the mark already assigned to the intersecting portion are merged or incorporated into a single arrangement position as a merged display manner. For example, an average of the two arrangement positions or predetermined one of the two arrangement positions can be an updated arrangement position shared by the two marks. In addition, a larger area containing the two arrangement positions of the marks can be an updated arrangement position. For instance, an intersecting portion may be illustrated as a symbol having a relatively large size to contain more than two marks. In such a case, those marks contained in the symbol are incorporated in a single symbol for indicating an intersecting portion in the mark display range.

Figure 9:
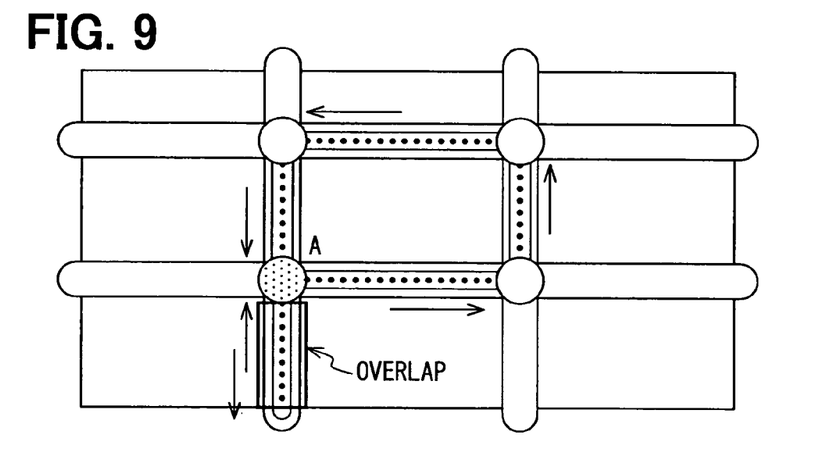
FIG. 9 is a schematic diagram illustrating an example of an image where an overlapping portion is included in a mark display range along a guidance route.

After executing S13, or when the determination at S12 is No, the processing moves to S14. Then, at S14, it is determined whether (i) the mark arrangement position determined at S11 taking place just before is included in an overlapping portion of the guidance route, which will be explained later, and (ii) the overlapping portion is already assigned with a mark. When the determination at S14 is Yes, the processing moves to S15. At S15, it is determined that the mark whose arrangement position is determined at S11 taking place just before is not arranged. Thus, when the mark display range includes an overlapping portion of the guidance route, marks are arranged only with respect to the range closer to the vehicle (i.e., further backward) along the user's travel direction. In addition, in the present embodiment, an overlapping portion is generated when the guidance route passes through an identical road as illustrated in FIG. 9.

After executing S15, or when the determination at S14 is No, the processing moves to S16. At S16, it is determined whether arrangement of all the marks is completed. That is, it is determined whether the mark arrangement position is determined up to the other end of the mark display range, which is opposite the one end from which the determination of the mark arrangement position is started. When the arrangement of all the marks is completed (S16: Yes), the processing moves to S17. In addition, when the arrangement of the marks is not completed (S16: No), the processing returns to S11 for repetition.

At S17, the marks are displayed on the individual mark arrangement positions determined repeatedly at S11 to S16.

At S18, it is determined whether the subject vehicle gets out of (or exits from) the mark display range. When the determination at S18 is No, S18 is executed again. In addition, while repeating the determination at S18, the marks displayed at S17 are displayed continuously.

In contrast, when the determination at S18 is Yes, the processing moves to S19. At S19, the displayed mark is erased or eliminated. Then, the processing returns to the mark display range determination process.

After returning to the mark display range determination process, a reference guidance point is newly defined as a next reference guidance point as follows. A next reference guidance point is the nearest from a user's present position among guidance points, which exist in a forward direction of the travel direction without being included in the mark display range, which is previously determined and the vehicle has exited from. In an example shown in FIG. 7, wherein a present reference guidance point is A with Y=3, a guidance point D is assigned as a next reference guidance point. This is because the guidance point D is the nearest among guidance points D, E outside of or beyond the mark display range Y along the travel direction.

In the embodiment, during a mark display range determination process or a mark display process, a map scale change process may be executed or a user's present position may deviate from a guidance route. In such a case, the mark display range determination process or the mark display process is interrupted and the processing returns to S1 to re-start a mark display range determination process.

Figure 8:
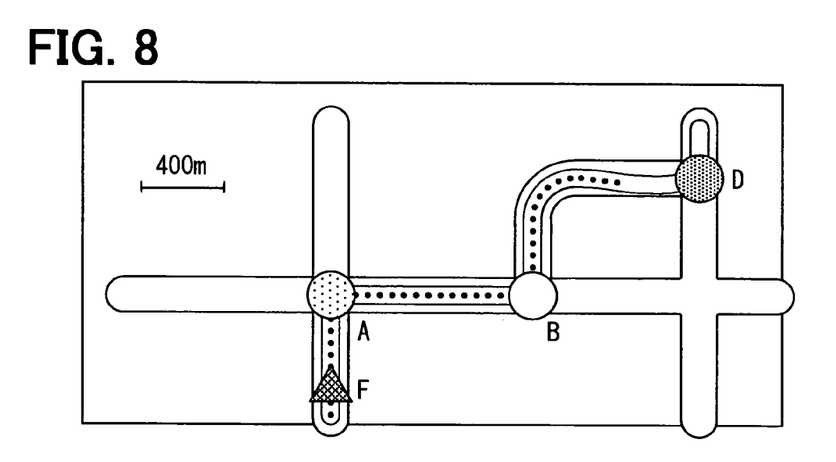
FIG. 8 is a schematic diagram illustrating an example of an image displayed as a result of the process for displaying marks.

Here, a display example of the marks displayed in the display device 11 is explained using FIG. 8. The scale of the map of the display example in FIG. 8 is 400 m (corresponding to a scale ration of C/400). As illustrated in FIG. 8, the guidance route is illustrated using a double solid line; multiple marks (dots in the example) are superimposed on the guidance route at fixed intervals. Furthermore, the present position mark F which illustrates the user's present position is also illustrated on the map in FIG. 8. The display position of the present position mark F on the map is also moved with the user's movement. In FIG. 8, there are neither intersecting portion nor overlapping portion within the mark display region.

Figure 10:
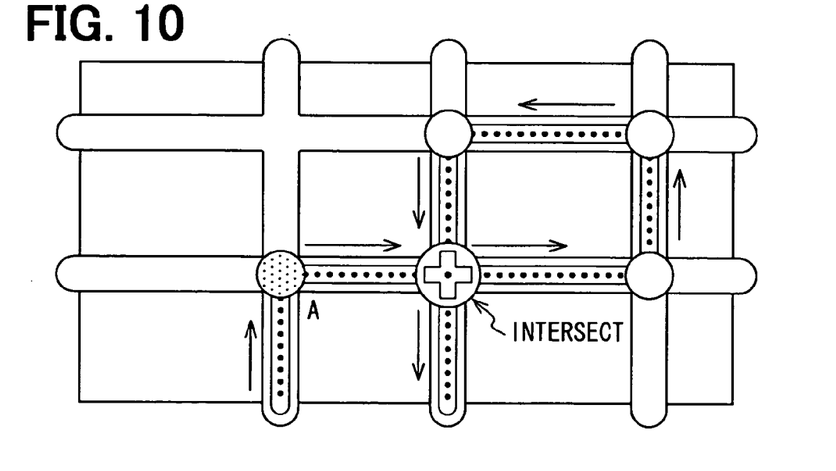
FIG. 10 is a schematic diagram illustrating an example of an image where an intersecting portion is included in a mark display range along a guidance route.

Next, the following explains display examples of marks when the mark display range includes an overlapping portion and an intersecting portion using FIG. 9 and FIG. 10, respectively.

In FIG. 9, a portion enclosed with the rectangle indicates an overlapping portion of the mark display range included in the guidance route. With respect to the overlapping portion, the determination at S14 in FIG. 6 results in Yes, so S15 is executed. Thus, the marks corresponding to the part closer to the user's present position, i.e., the part further backward in the travel direction, are only displayed in the overlapping portion along the guidance route.

Further, in FIG. 10, a portion pointed by an arrow indicates an intersecting portion of the mark display range included in the guidance route. With respect to the intersecting portion, two arrangement points may be determined at S11 in FIG. 6. However, the determination at S12 results in Yes, S13 is executed to thereby merge two mark arrangement positions as mentioned above. Therefore, as illustrated in FIG. 10, only a single mark or symbol is displayed on the intersecting portion as a merged display manner.

As mentioned above, according to the present embodiment, when the map scale of the map presently displayed in the display device 11 is a mark displayable scale, multiple marks are illustrated within the mark display range on the basis of a reference guidance point at a fixed real distance of an interval between the marks. Therefore, when the map scale is changed by the map scale change process, a visible displayed distance of an interval between adjacent marks is greater as the scale ratio of the map is greater (i.e., as the map covers narrower area). This enables a user, who is guided along the guidance route, to intuitively grasp the distance on the map by the difference in the visible displayed intervals of marks resulting from the change in the map scales.

Figure 11A:
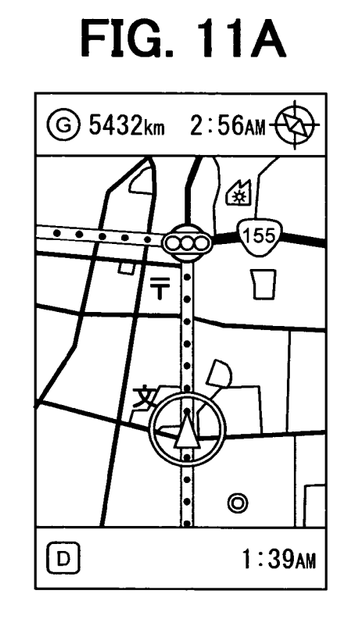
FIGS. 11A to 11C are examples of marks displayed in different scales of maps.
Figure 11B:
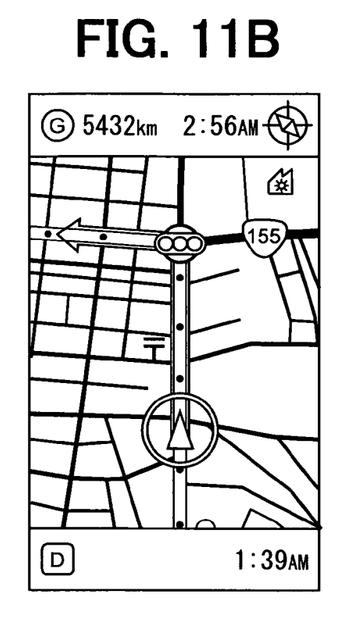
Figure 11C:
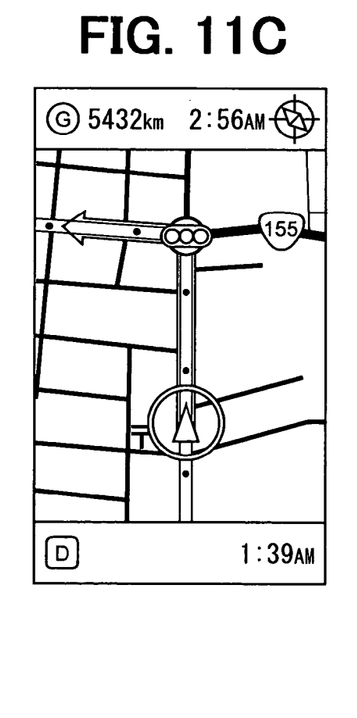

Such advantage is explained using FIGS. 11A to 11C. FIG. 11A is a display example of marks in a map scale of 200 m. FIG. 11B is a display example of marks in a map scale of 100 m. FIG. 11C is a display example of marks in a map scale of 50 m. In the above drawings, a mark is illustrated as a dot shape whereas a present position is illustrated as a an arrow encircled by a circle. In addition, an intersection representing an icon shaped of a traffic signal signifies a guidance point, which is designated as a reference guidance point.

In the present embodiment, since the real distance of the interval of the marks is fixed without depending on the scales of the map, the visible or displayed distance of the interval becomes greater as the map scale ratio becomes greater like from FIG. 11A to FIG. 11C. Therefore, it is easy for the user to more intuitively grasp the distance from the present position to the reference guidance point by counting the number of the marks presently displayed from the present position to the reference guidance point.

In addition, the present invention is not limited to the above embodiment and can be executed in various modified manners based on the scope of the present invention.

In the above-mentioned embodiment, when the user's present position exceeds the mark display range, marks are erased. However, it can be alternatively designed that the marks need not be erased even when the present position exceeds or exits from the mark display range. In such design, the marks illustrated for the previous mark display range may be erased finally when a new mark display range is determined on the basis of a next reference guidance point. Further, alternatively, marks may be simultaneously illustrated with respect to the two (previous and new) mark display ranges.

In addition, the above-mentioned embodiment explains the mark display range as including both the forward portion and backward portion with respect to the reference guidance point along the guidance route. However, without being limited to the above, either forward portion or backward portion may be only illustrated.

Herein, if both the forward and backward portions with respect to the reference guidance point are illustrated, the following advantage arises; namely, even if the number of marks between the present position and the reference guidance point is very few, e.g., only one, marks are still illustrated in the forward portion. Thus, even when the map scale is changed to another map scale, a user can easily recognize a distance on the map.

In the above embodiment, when an overlapping portion is present within the mark display range along the guidance route, marks further backward in the travel direction are only displayed. Without being limited to the above, for example, in the overlapping portion, both the marks further backward and the marks further forward may be simultaneously displayed.

In such configuration, when same distance intervals are used for the marks further backward and the marks further forward, the displayed marks are dense so that the user may not easily recognize a distance on the map. Therefore, when an overlapping portion is included in the mark display range, it is desirable that only the marks further backward in the travel direction of the vehicle are displayed.

In addition, in the above embodiment, when an intersecting point is included in the mark display range along the guidance route, both the mark further backward and the mark further forward are merged and displayed, for instance. Without being limited to the above, for example, in the intersecting portion, either the mark further backward or the mark further forward may be only displayed.

In such a configuration, the intervals of the marks in the intersecting portion is less dense, so the user may not easily recognize a distance on the map. Therefore, when an intersecting portion is included in the mark display range, it is desirable that the marks further backward and the marks further forward are displayed in a merged display manner.

In addition, although one end of the mark display range is used as a base point for determining a mark arrangement position, a reference guidance point may be used instead.

In addition, the above embodiment of the present invention is directed to a navigation apparatus mounted in a vehicle, such as a car. Without being necessarily limited to the above, it may be directed to one function of a terminal device, such as a cellular phone or a PDA (Personal Digital Assistant) for navigating with the GPS function.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As an aspect of the disclosure, a navigation apparatus is provided as follows. A map data input means is configured to input map data. A designation means is configured to designate a departure point and a destination point. A route retrieval means is configured to retrieve a route from the departure point to the destination point using the map data. A presentation means is configured to display a plurality of marks in a mark display range on a map generated based on the map data. The mark display range includes at least one of a forward direction and a backward direction along the retrieved route with a guidance point assigned as a base point. A map scale switching means is configured to switch map scales therebetween. Herein, the presentation means is configured to fix a real distance of an interval between the marks displayed on the map, without depending on the map scales switched.

Under the above configuration, even if the scale of the map is changed, a real distance of an interval between multiple marks is fixed. Thus the visible displayed interval of the multiple marks is greater as the ratio of the scale of the map is greater (i.e., as the displayed map cover narrower area). This can provide an advantage of enabling a user to more easily recognize a real distance on the map based on the difference of the displayed intervals resulting from the change in the scales of the map.

As an optional aspect, the mark display range may include both the forward direction and the backward direction along the retrieved route with the guidance point assigned as the base point.

In such a configuration, even if only few marks (e.g., only one mark) are included between a user's present position and a guidance point, multiple other marks are certainly displayed in the forward direction ahead of the guidance point. This allows a user to much easily recognize a real distance on the map even when the scale of the map is changed.

Further, in an overlapping or intersecting portion arising in the display range, if marks are displayed at the same intervals, the marks are overlapped with each other to thereby generate inconstant intervals being partially dense and non-dense. This may prevent a user from intuitively recognize a distance on the map. In contrast, the following two optional aspects allows the intuitive recognition of the distance on the map even if an overlapping and intersecting portion are included, respectively, in the mark display range since the marks can be arranged at equal intervals.

Thus, as an optional aspect, when an overlapping portion is included in the mark display range along the retrieved route, the presentation means may be configured to display, in the overlapping portion, only marks further backward in the mark display range along the retrieved route.

Further, as an optional aspect, when an intersecting portion is included in the mark display range along the retrieved route, the presentation means may be configured to display, in the intersecting portion, both a mark further backward and a mark further forward in the mark display range along the retrieved route, in a merged display manner.

As another aspect of the disclosure, a method is provided for achieving the functions or configuration of the above navigation apparatus.

It will be obvious to those skilled in the art that various changes may be made in the above-described embodiments of the present invention. However, the scope of the present invention should be determined by the following claims.

What is claimed is:

1. A navigation apparatus for a vehicle, the navigation apparatus comprising:

a position detection device that detects a present position of the vehicle;

means for inputting map data;

means for designating a departure point and a destination point of the vehicle;

means for retrieving a route that is along a travel direction of the vehicle from the departure point to the destination point using the map data;

a means for making a determination for delivery to a display device, the determination being to display a plurality of marks in a mark display range on a road in the retrieved route on a map generated based on the map data, the plurality of marks not being displayed outside the mark display range on the road in the retrieved route, the plurality of marks being arranged at intervals on the road in the retrieved route, the mark display range ranging from a reference guidance point at least one of in a forward direction and in a backward direction along the retrieved route, the reference guidance point being an intersection at which a right or left turn is needed for the vehicle in the retrieved route; and means for switching a scale ratio of the map by scaling a real distance to a visible displayed distance in the display device based on the scale ratio, wherein:

the means for determining determines to not display the plurality of marks in the display device, when a real distance between the present position of the vehicle detected by the position detection device and the reference guidance point is greater than a predetermined mark display execution distance; and the means for determining determines to display the plurality of marks in the mark display range on the road in the retrieved route in the display device such that a visible displayed distance of an interval between the plurality of marks is changed in the display device depending on changing of the scale ratio while a real distance corresponding to the visible displayed distance of the interval between the plurality of marks is unchanged without depending on the changing of the scale ratio, when the real distance between the present position of the vehicle and the reference guidance point is equal to or less than the predetermined mark display execution distance.

2. The navigation apparatus according to claim 1, wherein the means for determining is configured to determine to display the plurality of marks in the mark display range on the map, the mark display range ranging from the reference guidance point both in the forward direction and in the backward direction along the retrieved route.

3. The navigation apparatus according to claim 1, wherein when an overlapping portion is included in the mark display range along the retrieved route, the means for determining is configured to determine to display, in the overlapping portion, only marks further backward in the mark display range along the retrieved route.

4. The navigation apparatus according to claim 1, wherein when an intersecting portion is included in the mark display range along the retrieved route, the means for determining is configured to determine to display, in the intersecting portion, a mark further backward and a mark further forward in the mark display range along the retrieved route, in a merged display manner.

5. The navigation apparatus according to claim 1, wherein
(i) the means for determining determines to display the plurality of marks when the real distance between the present position of the vehicle and the reference guidance point is equal to or less than the predetermined mark display execution distance, in cases that a scale ratio of the map is greater than a map scale ratio of a predetermined mark display boundary scale; and
(ii) the means for determining determines to not display the plurality of marks regardless of the real distance between the present position of the vehicle and the reference guidance point, in cases that the scale ratio of the map is not greater than the map scale ratio of the predetermined mark display boundary scale.

6. The navigation apparatus according to claim 1, wherein each interval between consecutive marks of the plurality of marks is selected to be a predetermined substantially same real distance.

7. The navigation apparatus according to claim 1, wherein the means for making the determination
determines whether the vehicle is out of the mark display range,
determines a new mark display range to a next reference guidance point along the retrieved route and determines to erase the plurality of marks which are out of the new mark display range, when the vehicle is out of the mark display range, and
continues to determine display the plurality of marks, when the vehicle is not out of the mark display range.

8. The navigation apparatus according to claim 1, wherein a size of each of the marks is unchanged when the scale ratio is changed.

9. A method for displaying a map in a display device of a navigation apparatus storing map data in a storage media and retrieving a route to a destination, the method being executed by a computer in the navigation apparatus, the method comprising:

detecting a present position of the vehicle using a position detection device;

designating a departure point and a destination point of the vehicle using a designation device;

retrieving a route that is along a travel direction of the vehicle from the departure point to the destination point using the map data;

displaying in the display device a plurality of marks within a mark display range on a road in the retrieved route on a map generated based on the map data, the plurality of marks not being displayed outside the mark display range on the road in the retrieved route, the plurality of marks being arranged at intervals on the road in the retrieved route, the mark display range ranging from a reference guidance point at least one of in a forward direction and in a backward direction along the retrieved route, the reference guidance point being an intersection at which a right or left turn is needed for the vehicle in the retrieved route; and changing a scale ratio of the map by scaling a real distance to a visible displayed distance in the display device based on the scale ratio, wherein:

the plurality of marks are not displayed in the display device, when a real distance between the present position of the vehicle and the reference guidance point is greater than a predetermined mark display execution distance; and the plurality of marks are displayed in the mark display range on the road in the retrieved route in the display device such that a visible displayed distance of an interval between the plurality of marks is changed in the display device depending on changing of the scale ratio while a real distance corresponding to the visible displayed distance of the interval between the plurality of marks is unchanged without depending on the changing of the scale ratio, when the real distance between the present position of the vehicle and the reference guidance point is equal to or less than the predetermined mark display execution distance.

10. The method according to claim 9, wherein each interval between consecutive marks of the plurality of marks is selected to be a predetermined substantially same real distance.

11. The method according to claim 9, further comprising
determining whether the vehicle is out of the mark display range,
determining a new mark display range to a next reference guidance point along the retrieved route and determining to erase the plurality of marks which are out of the new mark display range, when the vehicle is out of the mark display range, and
continuing to determine display the plurality of marks, when the vehicle is not out of the mark display range.

12. The method according to claim 9, wherein a size of each of the marks is unchanged when the scale ratio is changed.

13. A navigation apparatus for a vehicle, the apparatus comprising:
a position detection device that detects a present position of the vehicle;
a map data input device that inputs map data;
a designation device that designates a departure point and a destination point of the vehicle; and
a control device, the control device being configured to:
retrieve a route that is along a travel direction of the vehicle from the departure point designated by the designation device to the destination point designated by the designation device, using the map data from the map data input device;
make a determination for delivery to a display device, the determination being to display a plurality of marks in a mark display range on a road in the retrieved route on a map generated based on the map data from the map data input device, the plurality of marks not being displayed outside the mark display range on the road in the retrieved route,
the plurality of marks being arranged at intervals on the road in the retrieved route,
the mark display range ranging from a reference guidance point at least one of in a forward direction and in a backward direction along the retrieved route,
the reference guidance point being an intersection at which a right or left turn is needed for the vehicle in the retrieved route; and
change a scale ratio of the map by scaling a real distance to a visible displayed distance in the display device based on the scale ratio,
wherein:
the control device is configured to determine to not display the plurality of marks in the display device, when a real distance between the present position of the vehicle as detected by the position detection device and the reference guidance point is greater than a predetermined mark display execution distance; and
the control device is configured to determine to display the plurality of marks in the mark display range on the road in the retrieved route in the display device such that a visible displayed distance of an interval between the plurality of marks is changed in the display device depending on changing of the scale ratio while a real distance corresponding to the visible displayed distance of the interval between the plurality of marks is unchanged without depending on the changing of the scale ratio, when the real distance between the present position of the vehicle and the reference guidance point is equal to or less than the predetermined mark display execution distance.

14. The navigation apparatus according to claim 13, wherein
the control device is configured to determine to display the plurality of marks in the mark display range on the map, the mark display range ranging from the reference guidance point both in the forward direction and in the backward direction along the retrieved route.

15. The navigation apparatus according to claim 13, wherein
the control device is configured to determine to display, in the overlapping portion, only marks further backward in the mark display range along the retrieved route, when an overlapping portion is included in the mark display range along the retrieved route.

16. The navigation apparatus according to claim 13, wherein
the control device is configured to determine to display, in the intersecting portion, a mark further backward and a mark further forward in the mark display range along the retrieved route, in a merged display manner, when an intersecting portion is included in the mark display range along the retrieved route.

17. The navigation apparatus according to claim 13, wherein
(i) the control device determines to display the plurality of marks when the real distance between the present position of the vehicle and the reference guidance point is equal to or less than the predetermined mark display execution distance, in cases that a scale ratio of the map is greater than a map scale ratio of a predetermined mark display boundary scale; and
(ii) the control device determines to not display the plurality of marks regardless of the real distance between the present position of the vehicle and the reference guidance point, in cases that the scale ratio of the map is not greater than the map scale ratio of the predetermined mark display boundary scale.

18. The navigation apparatus according to claim 13, wherein each interval between consecutive marks of the plurality of marks is selected to be a predetermined substantially same real distance.

19. The navigation apparatus according to claim 13, wherein the control device
determines whether the vehicle is out of the mark display range,
determines a new mark display range to a next reference guidance point along the retrieved route and determines to erase the plurality of marks which are out of the new mark display range, when the vehicle is out of the mark display range, and
continues to determine display the plurality of marks, when the vehicle is not out of the mark display range.

20. The navigation apparatus according to claim 13, wherein a size of each of the marks is unchanged when the scale ratio is changed.

* * * * *